J. D. McLAURIN.
PROCESS OF TREATING ADHESIVE BINDERS.
APPLICATION FILED JUNE 10, 1909.
954,644.  Patented Apr. 12, 1910.
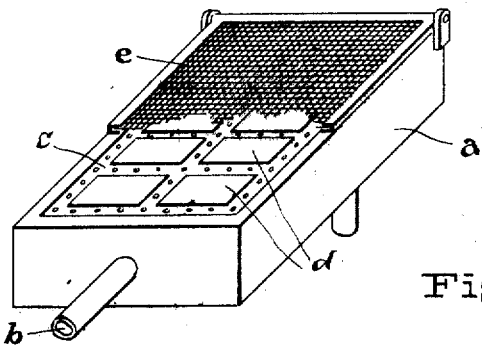
Fig. 1.
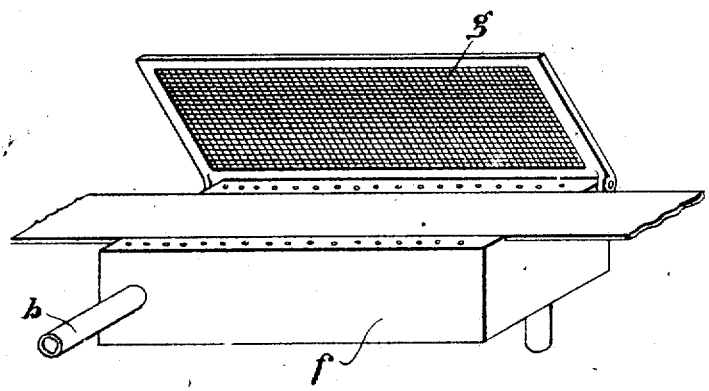
Fig. 2.
Fig. 3.
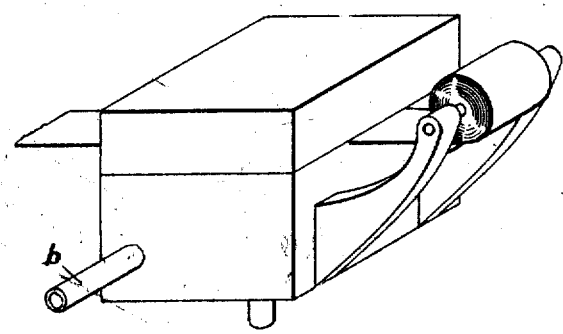
Fig. 4.
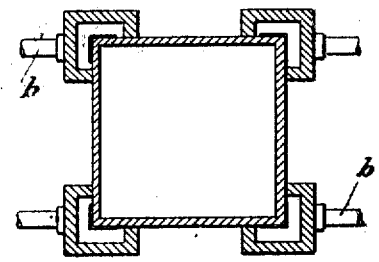
WITNESSES:
J. Clyde Ripley.
K. Brenner.
INVENTOR
James D. McLaurin
BY
B. H. Becker
ATTORNEY

UNITED STATES PATENT OFFICE.

JAMES D. McLAURIN, OF NEW YORK, N. Y.

PROCESS OF TREATING ADHESIVE BINDERS.

954,644.  Specification of Letters Patent.  Patented Apr. 12, 1910.

Application filed June 10, 1909. Serial No. 501,432.

*To all whom it may concern:*

Be it known that I, JAMES D. McLAURIN, a subject of King Edward VII of Great Britain, now residing in New York, in the county of New York and State of New York, (whose post-office address is 154 Nassau street, New York, N. Y.,) have invented a certain new and useful Process of Treating Adhesive Binders, of which the following is a full, clear, and exact description, whereby any one skilled in the art may make and use the same.

The invention relates to the process or method of treating adhesive material or materials, to which an adhesive has been applied, in such manner, that said adhesive materials will be thoroughly and uniformly softened, in order to properly attach the material and secure the proper binding effect of the adhesive.

In carrying out the process, the material bearing the adhesive, together with the adhesive is subjected to a warm moist vapor, in such manner that the life and body of the gum or adhesive is not destroyed or diminished and the material bearing the adhesive is at the same time partially digested and assumes such form, that it will become uniformly softened and absorbent, thus permitting the adhesive to act with gradual and uniform drying effect.

It has been found, in attempting to attach labels or other binders coated with an adhesive, that the application of water tends to remove a portion of the adhesive and ordinarily cannot be used to such an extent as will properly reduce the character of the material bearing the adhesive. For instance, where labels, corner-stays, veneers, or like materials coated with adhesives are to be applied, it is common practice to draw the surface over a moistening pad or immerse the materials to a greater or less extent in a fluid. Where such materials are passed over a moistening pad, a great percentage of the gum is removed by the abrasive action of the moistener in conjunction with the fluid used. When the materials are immersed, a great percentage of the gum is dissolved and the bath thus causes the exterior portion of the material to become gummed and often destroys its appearance and usefulness.

In addition to the above disadvantages of present methods, it is almost impossible to moisten materials of considerable body so that the adhesive, in drying, will dry uniformly with the material, which it binds together. The result is a curling and cracking of the material, to say nothing of the loss of time required in applying such materials in their various uses. For instance, in sealing packages and placing corner-stays upon boxes, in setting veneers and in various other branches of the arts, where adhesives are used, a considerable pressure must be brought to bear upon the material after its adhesive has been moistened and this pressure must be maintained until the gum has thoroughly set. Otherwise, the unequal tensions due to the comparatively dry label and over-moistened gum will cause a buckling and crimping of the material which destroys the holding qualities of the gum.

The present process is designed to overcome these objections, so far as possible, by making the material, with its adhesive, uniformly soft and absorbent so that, when placed in contact with another material, it will dry out gradually and prevent uneven tensions.

The material with its adhesive is subjected to a jet or spray of heated vapor, for a sufficient period, to soften both the gum and the material, to such an extent, that when applied to another material, the gum will adhere and a slight pressure will smooth the material into proper position, where it will dry gradually and uniformly.

Various devices may be used for carrying out the process depending upon the character of the material which is to be subjected to the softening action. For instance, in treating labels of varying sizes and character, said labels are preferably placed upon a perforated screen through which is projected a hot moist vapor such as steam. Such an arrangement is diagrammatically illustrated in Figure 1, where *a* represents a moistening box, into which steam is projected through a tube *b*, and passes out through a perforated cover *c*. The labels *d*, are placed with the gum side down upon the perforated top and preferably held in place under light pressure by a perforated retainer *e*. The moist steam passing through the cover gradually softens the adhesive and the material to which it is applied and renders the labels perfectly flexible and uniformly moist without removing any appreciable percentage of the gum. Veneer boards and similar materials may, in the same way, be subjected to the action of the steam as illustrated in Fig. 2. In such case, however, the material, being of considerable thickness and weight, is preferably subjected directly to the action of the steam, as in a receptacle $f$, provided with a retaining cover $g$, the steam being admitted to the receptacle through an inlet $b$, passes up about the strip or strips of veneer board and gradually softens the adhesive and the board. If the material is in the form of a roll of gummed tape, said tape may be passed through a similar digesting apparatus illustrated in diagram at Fig. 3.

In treating box-stays, the moist steam may be introduced through clamp members as illustrated in Fig. 4, or the binders may be first passed through a moistening box, where they will be subjected to the direct action of the steam for a period sufficient to properly reduce the gum and material from which the box-stay is made.

The process is particularly advantageous in conjunction with the treatment of gummed papers or fibrous materials. As is well known, these materials are formed from fibrous substances which are first digested and then formed into sheets or webs and solidified in the ordinary methods of paper manufacture, then covered with an adhesive, which is completely dried out. By subjecting such materials with the adhesive to the action of steam, the gum is rendered soft and pliable and the entire material is partially digested so that it will conform to any desired shape of the material to which it is applied. The digestion being gradual, the materials are made uniformly soft and absorbent and thus permit the adhesive to permeate the material. The drying of the gum and material is therefore gradual and uniform. Obviously various forms of devices might be utilized for effecting the result in any specific instance, but the process of preparing the adhesive binders consists of subjecting them to the direct action of steam and thereby partially digesting the material and softening the gum.

What I claim as my invention and desire to secure by Letters Patent is:

1. The process of treating adhesive binders which consists in subjecting the binding material and its adhesive to the direct action of a hot moist vapor, thereby reducing said material to a condition of uniform moisture.

2. The process of treating adhesive binders which consists in subjecting the binding material and its adhesive to the direct action of a hot moist vapor, thereby reducing the material without removing any of the adhesive.

3. The process of treating adhesive binders which consists in subjecting said binders bearing an adhesive material while dry to the direct action of a hot moist vapor, thereby reducing the material without removing any of its substance.

JAMES D. McLAURIN.

Witnesses:
 JOHN A. MORISON,
 GEORGE GOODSIR, Jr.